(12) United States Patent
Srivastava et al.

(10) Patent No.: US 11,783,270 B2
(45) Date of Patent: Oct. 10, 2023

(54) TECHNOLOGIES FOR USING MACHINE LEARNING TO ASSESS CONTRACT PRICING

(71) Applicant: MCKINSEY & COMPANY, INC., New York, NY (US)

(72) Inventors: Vaibhav Srivastava, Chicago, IL (US); Rukmananda Suresh Mallya Perdur, Pearland, TX (US); Sukesh Shekar, Houston, TX (US); Jeff Hart, Spring, TX (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/984,649

(22) Filed: Nov. 10, 2022

(65) Prior Publication Data

US 2023/0142754 A1    May 11, 2023

Related U.S. Application Data

(60) Provisional application No. 63/277,967, filed on Nov. 10, 2021.

(51) Int. Cl.
*G06Q 10/08*    (2023.01)
*G06Q 30/0201*    (2023.01)
*G06Q 10/0631*    (2023.01)

(52) U.S. Cl.
CPC ....... *G06Q 10/08* (2013.01); *G06Q 10/06315* (2013.01); *G06Q 30/0206* (2013.01)

(58) Field of Classification Search
CPC ............. G06Q 10/08; G06Q 10/06315; G06Q 30/0206
See application file for complete search history.

(56) References Cited

U.S. PATENT DOCUMENTS

2022/0261712 A1*    8/2022    Stone ................ G06Q 10/0635

* cited by examiner

*Primary Examiner* — A. Hunter Wilder
(74) *Attorney, Agent, or Firm* — MARSHALL, GERSTEIN & BORUN LLP; Randall G. Rueth

(57) ABSTRACT

Systems and methods for using machine learning to dynamically assess contract parameters are disclosed. According to certain aspects, an electronic device may train a machine learning model using real-world pricing and contract data, access parameters associated with a potential contract for an entity, and analyzing, using the machine learning model, the accessed parameters. Based on the analysis, the machine learning model may output a set of potential terms for the potential contract. Data indicative of this output may be availed to the entity to be used in negotiating and executing the contract, among other uses.

17 Claims, 9 Drawing Sheets

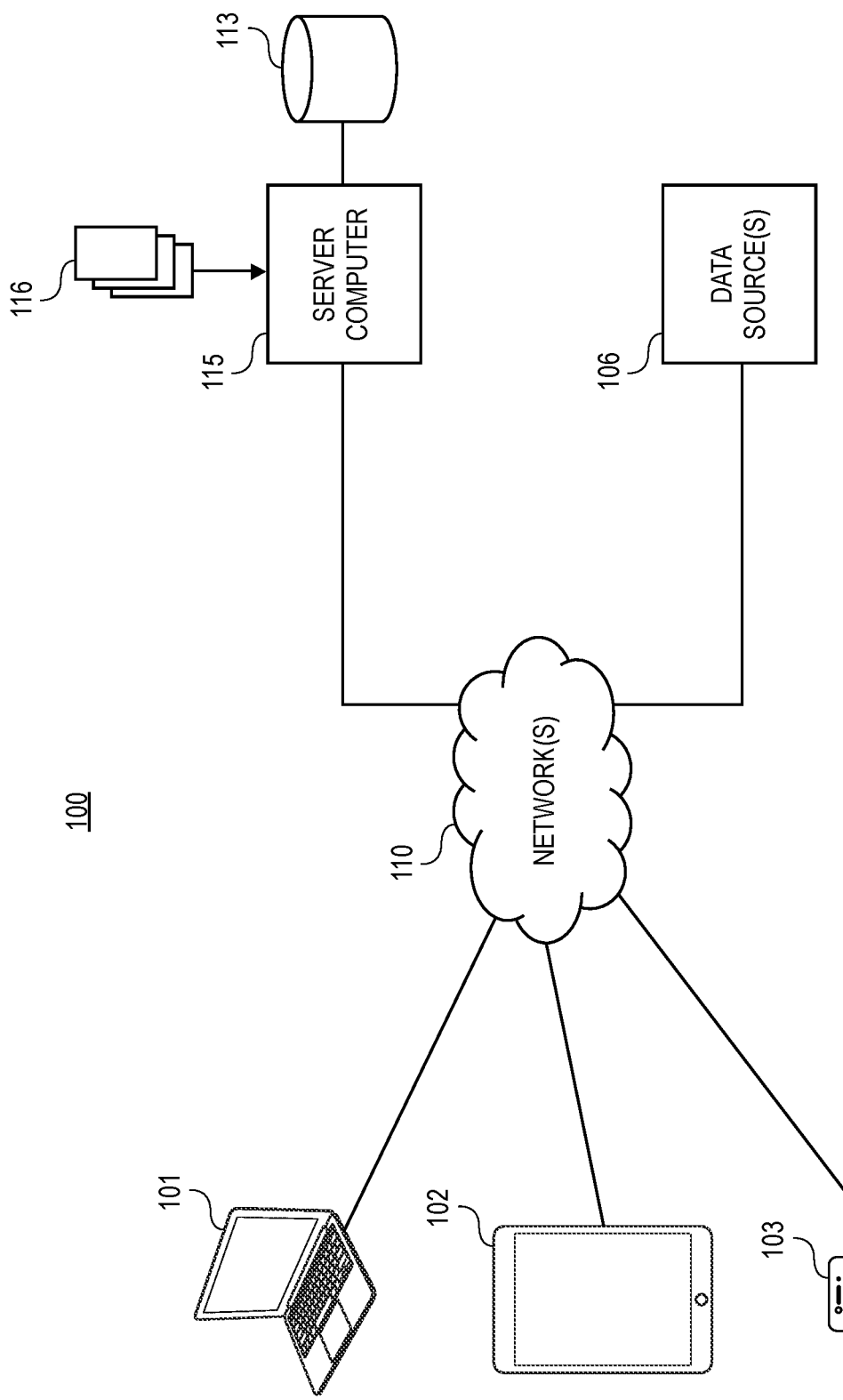

TECHNOLOGIES FOR USING MACHINE LEARNING TO ASSESS CONTRACT PRICING

CROSS-REFERENCE TO RELATED APPLCIATIONS

This application claims priority to U.S. Patent Application No. 63/277,967, filed Nov. 10, 2021, the disclosure of which is hereby incorporated by reference in its entirety.

FIELD

The present disclosure is directed to improvements related to assessing conditions for contracts between parties. More particularly, the present disclosure is directed to platforms and technologies for using machine learning to assess real-world market conditions to determine favorable parameters for potential contracts.

BACKGROUND

Generally, companies, corporations, and the like enter into various contracts with customers, suppliers, and the like in the normal course of business. For example, industrial companies consistently enter into contracts with suppliers for raw materials or other commodities. These contracts vary in duration, price, constraints, and scope. Additionally, when contracts are set of expire, parties may look to renew contracts using the same or similar terms as the previously-signed contracts. Generally, the set of contracts and the renewal of the set of contracts for a given company may be encompassed as a portfolio of contracts for the company.

However, there are limitations and challenges associated with companies entering into or renewing contracts. In particular, there is an inability for companies to test overall performance of the contracts in their portfolios. Further, there is a lack of transparency into drivers of portfolio and contract performance over time. Additionally, companies use old and inefficient processes to set portfolio strategy and renegotiate contract terms.

Accordingly, there is an opportunity for platforms and technologies to assess conditions associated with potential contracts and determine potential parameters for the potential contracts.

SUMMARY

In an embodiment, a computer-implemented method of using machine learning to assess contracts is provided. The method may include: training, by one or more processors using a set of training data, a machine learning model, the set of training data comprising a set of contracts and, for each contract of the set of contracts, a set of terms associated with that contract; storing, in one or more memories, the machine learning model; accessing, by the one or more processors, a potential contract for an entity, the potential contract specifying a set of parameters; accessing, by the one or more processors, a set of market conditions associated with the set of parameters for the potential contract; analyzing, by the one or more processors using the machine learning model, the set of parameters and the set of market conditions; and based on analyzing the set of parameters and the set of market conditions, outputting, by the machine learning model, a set of potential terms for the potential contract.

In another embodiment, a system for using machine learning for assessing contracts is provided. The system may include a memory storing a set of computer-readable instructions and data associated with a machine learning model, and one or more processors interfaced with the memory. The one or more processors may be configured to execute the set of computer-readable instructions to cause the one or more processors to: train, using a set of training data, the machine learning model, the set of training data comprising a set of contracts and, for each contract of the set of contracts, a set of terms associated with that contract, store, in the memory, the machine learning model, access a potential contract for an entity, the potential contract specifying a set of parameters, access a set of market conditions associated with the set of parameters for the potential contract, analyze, using the machine learning model, the set of parameters and the set of market conditions, and based on analyzing the set of parameters and the set of market conditions, output, by the machine learning model, a set of potential terms for the potential contract.

Further, in an embodiment, a non-transitory computer-readable storage medium configured to store instructions executable by one or more processors is provided. The instructions may include: instructions for training, using a set of training data, a machine learning model, the set of training data comprising a set of contracts and, for each contract of the set of contracts, a set of terms associated with that contract; instructions for storing, in one or more memories, the machine learning model; instructions for accessing a potential contract for an entity, the potential contract specifying a set of parameters; instructions for accessing a set of market conditions associated with the set of parameters for the potential contract; instructions for analyzing, using the machine learning model, the set of parameters and the set of market conditions; and instructions for, based on analyzing the set of parameters and the set of market conditions, outputting, by the machine learning model, a set of potential terms for the potential contract.

BRIEF DESCRIPTION OF THE FIGURES

FIG. 1A depicts an overview of components and entities associated with the systems and methods, in accordance with some embodiments.

DETAILED DESCRIPTION

Figure 1B:
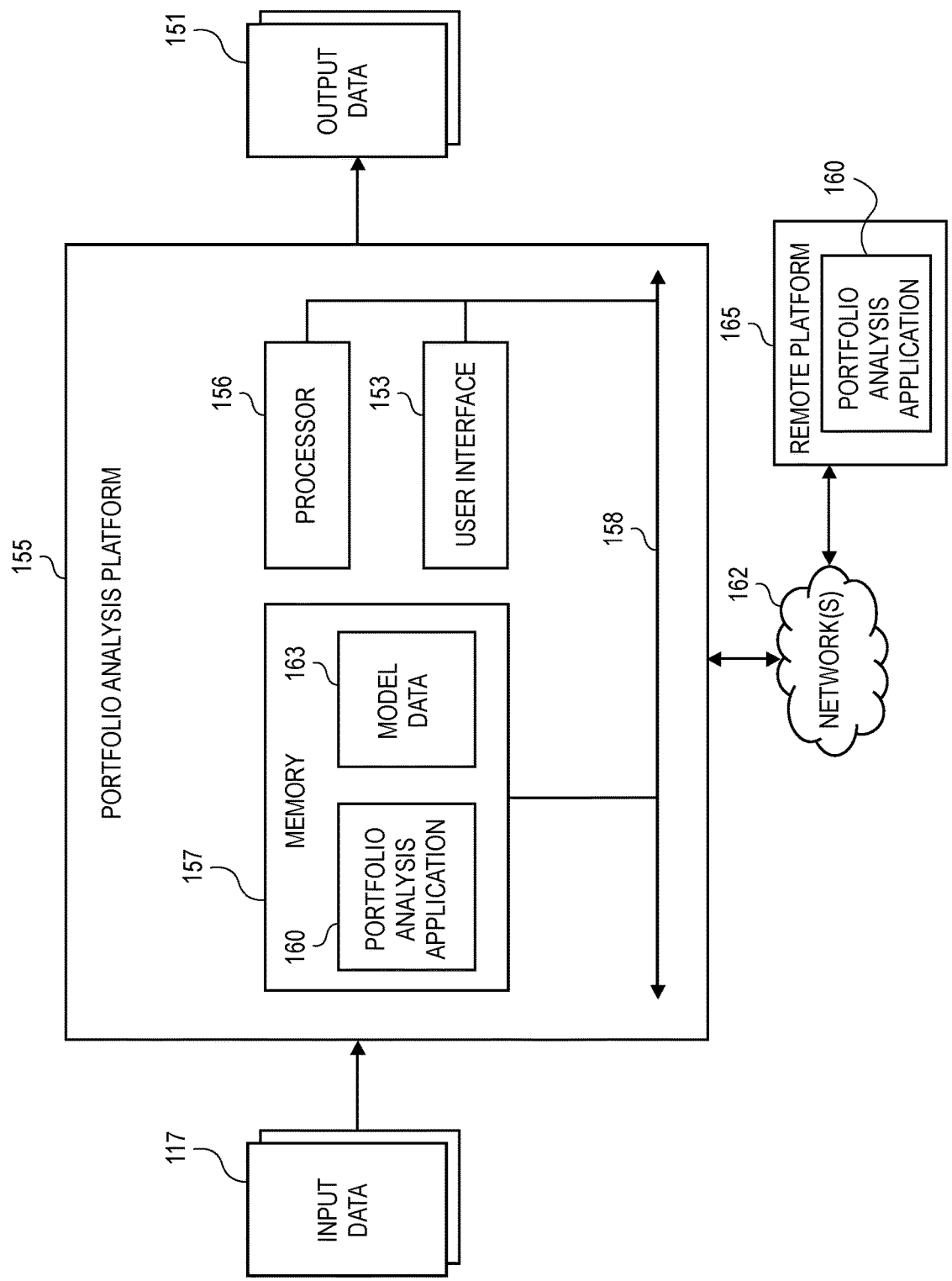
FIG. 1B depicts an overview of certain components configured to facilitate the systems and methods, in accordance with some embodiments.

The present embodiments may relate to, inter alia, using machine learning to assess conditions associated with potential contracts and/or contract renewals and determining potential parameters for the potential contracts and/or contract renewals. Generally, an entity may enter into a set of contracts with other entities, where the set of contracts may be encompassed as a portfolio for that entity. According to certain aspects, the described systems and methods may set portfolio strategy, facilitate operations associated with negotiating contracts, and track contract compliance.

In conventional portfolio strategy setting, parties must have intimate business and market knowledge from individuals such as product and pricing managers. According to the systems and methods, analytics-enabled techniques with quantitative recommendations are envisioned, where the recommendations consider factors difficult or impossible for a human to predict or model. Further, instead of an intuition-based decision making process that leverages information in silos collected by individuals in customer discovery, the systems and methods offer these analytics-enabled techniques with qualitative recommendations that allow transparency into customer performance over time under potential future market scenarios.

Additionally, instead of relying on internal capabilities to track compliance to terms and lack of universal key performance indicators (KPIs) and tracking mechanisms, the systems and methods offer analytics-enabled techniques with predictive triggers for non-compliance that allow for recommendations to offset value leakage from customer non-compliance. According to embodiments, the systems and methods may be configured to develop hypotheses on market scenarios and simulate contract archetypes, run portfolio allocation models to achieve optimal contract mixes, generate customer term recommendations that achieve portfolio targets, and develop forward-thinking markers for compliance tracking and benchmark customers over time.

The systems and methods therefore offer numerous benefits. In particular, the systems and methods use machine learning or artificial intelligence techniques to effectively and accurately recommend optimal portfolio allocation, achieve optimal product or chemical formulation, generate contract term-level recommendations for contract negotiations and renegotiations, assess a large variety of scenarios under different market and cost dynamics, and track customer compliance in real-time or near-real-time to reduce value leakage. It should be appreciated that additional benefits are envisioned.

The systems and methods represent an improvement to an existing technology(ies), namely technologies for assessing market conditions and data analysis technologies related to facilitating agreements. Existing solutions are not able to efficiently and effectively analyze relevant data to ascertain favorable contract terms. As a result, existing solutions do not allow for companies to test overall performance of contracts in their portfolios, and are limited by a lack of transparency into drivers of portfolio and contract performance over time, among other drawbacks.

The systems and methods improve on these existing technologies because the systems and methods access training data that includes a set of contracts and terms for those contracts, where the systems and methods train a machine learning model using the training data. When an entity contemplates a potential contract, the trained machine learning model efficiently analyzes parameters specified in the potential contract along with a set of market conditions associated with the parameters, and outputs a set of potential terms for the potential contract.

Generally, the training data encompasses large data sets related to existing contracts, and includes time periods and pricing parameters for contracts; goods, materials, commodities, or products specified by the contracts; transaction prices; customer constraints such as disallowed archetype shifts, minimum/maximum volume commitments, maximum/minimum price increases or decreases; price indices uses to track market prices; and/or other relevant data. Further, the systems and methods access additional large data sets indicating various relevant market conditions, price indices, historical transaction data, and the like, that the systems and methods uses to determine relevant terms that benefit from further assessment or analysis using the machine learning model.

The analysis of these terms, parameters, and conditions using the machine learning model represents an improvement on the discussed existing technologies because the machine learning model effectively and efficiently determines potential terms for the potential contract, where these potential terms are not otherwise able to be ascertained by the existing technologies. Additionally, the systems and methods update the machine learning model with data indicative of any executed contracts, and/or other data, so that the machine learning model may be consistently up-to-date, leading to continued improvement in subsequent analyses by the machine learning model.

The training and use of the machine learning model enables the systems and methods to process large datasets that the existing systems are unable to analyze as a whole. This results in improved processing time by the systems and methods. Additionally, by virtue of employing the trained machine learning model in its analyses, the systems and methods reduce the overall amount of data retrieval and communication necessary for the analyses of multiple potential contracts, reducing traffic bandwidth and resulting in cost savings.

The systems and methods discussed herein address a business challenge, namely a business challenge related to inefficiencies and challenges in determining contract parameters. In conventional platforms, entities manually negotiate and enter into contracts with each other. In contrast, the systems and methods employ machine learning techniques to assess real-time market conditions and determine potential terms for contracts, thus enabling entities with access to useful information that may be used in contract negotiations.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103 may be an electronic device associated with an individual or an entity such as a company, business, corporation, or the like (e.g., a server computer or machine).

The electronic devices 101, 102, 103 may communicate with a server computer 115 via one or more networks 110. In embodiments, the network(s) 110 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, 4G/5G/6G, Edge, and others). The server computer 115 may be associated with an entity such as a company, business, corporation, or the like (generally, a company). In some embodiments, the server computer 115 may be associated with a company that enters into or contemplates entering into a set of contracts with a set of other companies, businesses, corporations, or the like (e.g., a supplier of a particular commodity). The server computer 115 may include various components that support communication with the electronic devices 101, 102, 103.

The server computer 115 may communicate with one or more data sources 106 via the network(s) 110. In embodiments, the data source(s) 106 may compile, store, or otherwise access information associated with various market conditions, such as current and historical prices of raw materials or commodities, and/or other data and information. It should be appreciated that alternative and additional data sources are envisioned.

Generally, the data source(s) 106 may store information indicative of current and historical market conditions. In particular, the information may include current and historical prices of raw materials and other commodities. Additionally or alternatively, the information may include data indicating historical or current unsold volume or stockpiles associated with certain materials or commodities, as well as historical or current capacity constraints associated with relevant supply chains. Additionally or alternatively, the information may include parameters or terms associated with actual or simulated contracts, such as, for example, deal size, geography or applicable territory, product mix, channel type, and/or the like. The server computer 115 may analyze this data according to the functionalities as described herein, which may result in a set of training datasets 116. In some implementations, the server computer 115 may access the raw data or information (and/or training dataset 116) from one or more of the electronic devices 101, 102, 103.

The server computer 115 may receive, access, or generate the training dataset(s) 116, and may employ various machine learning techniques, calculations, algorithms, and the like to generate a set of machine learning models using the training dataset(s) 116. In particular, the server computer 115 may initially train a set of machine learning models using the training dataset(s) 116 and then apply or input a validation set into a set of generated machine learning models to determine which of the machine learning models is most accurate or otherwise may be used as the final or selected machine learning model.

According to embodiments, the server computer 115 may input, into the generated machine learning model, a set of input data that may include a set of parameters for a potential contract(s) as well as a set of market conditions associated with the set of parameters, where the server computer 115 may receive the set of parameters from one of the electronic devices 101, 102, 103 (or from another source) and retrieve the set of market conditions from the set of data sources 106. The machine learning model may analyze the input(s) and output a set of potential terms for the potential contract(s). A user of the electronic devices 101, 102, 103 (e.g., an individual associated with a company contemplating entering into the potential contract(s)) may review the result(s) or output(s) and use the information to negotiate, renegotiate, or facilitate other actions in association with the potential contract(s). In embodiments, a user may access the result(s) or output(s) directly from the server computer 115.

The server computer 115 may be configured to interface with or support a memory or storage 113 capable of storing various data, such as in one or more databases or other forms of storage. According to embodiments, the storage 113 may store data or information associated with the machine learning models that are generated by the server computer 115. Additionally, the server computer 115 may access the data associated with the stored machine learning models to input a set of inputs into the machine learning models.

Although depicted as a single server computer 115 in FIG. 1A, it should be appreciated that the server computer 115 may be in the form of a distributed cluster of computers, servers, machines, cloud-based services, or the like. In this implementation, the entity may utilize the distributed server computer(s) 115 as part of an on-demand cloud computing platform. Accordingly, when the electronic devices 101, 102, 103 interface with the server computer 115, the electronic devices 101, 102, 103 may actually interface with one or more of a number of distributed computers, servers, machines, or the like, to facilitate the described functionalities.

Although three (3) electronic devices 101, 102, 103, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which input data 117 is processed into output data 151 via a portfolio analysis platform 155, according to embodiments. The portfolio analysis platform 155 may be implemented on any computing device or combination of computing devices, including the server computer 115 and/or any of the electronic devices 101, 102, 103, as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The portfolio analysis platform 155 may further include a user interface 153 configured to present content (e.g., input data, output data, processing data, and/or other information). Additionally, a user may review results of a portfolio analysis and make selections to the presented content via the user interface 153, such as to review output data presented thereon, make selections, and/or perform other interactions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a portfolio analysis application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The portfolio analysis platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including any of the set of electronic devices 101, 102, 103 as discussed with respect to FIG. 1A, and may include many or all of the elements described above with respect to the platform 155. In some embodiments, the portfolio analysis application 160 as will be further described herein may be stored and executed by the remote platform 165 instead of by or in addition to the platform 155.

Generally, each of the input data 117 and the output data 152 may be embodied as any type of electronic document, file, template, etc., that may include various graphical/visual and/or textual content, and may be stored in memory as program data in a hard disk drive, magnetic disk and/or optical disk drive in the portfolio analysis platform 155 and/or the remote platform 165. The portfolio analysis platform 155 may support one or more techniques, algorithms, or the like for analyzing the input data 117 to generate the output data 151. In particular, the portfolio analysis application 160 may analyze various market conditions and other parameters associated with one or more potential contracts to assess or recommend certain terms or parameters for the potential contract(s). Based on the analysis, the portfolio analysis application 160 may output data (i.e., as the output data 151) that indicates potential terms or parameters for the potential contract(s). The memory 157 may store the output data 151 and other data that the portfolio analysis platform 155 generates or uses in associated with the analysis of the input data 117.

According to embodiments, the portfolio analysis application 160 may employ machine learning and artificial intelligence techniques such as, for example, a regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like. When the input data 117 is a training dataset, the portfolio analysis application 160 may analyze/process the input data 117 to generate a machine learning model(s) for storage as part of model data 163 that may be stored in the memory 157. In embodiments, various of the output data 151 may be added to the machine learning model stored as part of the model data 163. In analyzing or processing the input data 117, the portfolio analysis application 160 may use any of the output data 151 previously generated by the portfolio analysis platform 155.

The portfolio analysis application 160 (or another component) may cause the output data 151 (and, in some cases, the training or input data 117) to be displayed on the user interface 153 for review by the user of the portfolio analysis platform 155. Additionally, the portfolio analysis application 160 may analyze or examine the output data 151 to assess any potential terms or parameters for potential contracts, which may be displayed on the user interface 153 as part of a dashboard, interface, or the like. The user may select to review and/or modify the displayed data. For instance, the user may review the output data 151 to assess opportunities for contract negotiation or renegotiation.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, R, Stata, AI libraries). In some embodiments, the computer program product may be part of a cloud network of resources.

Figure 2:
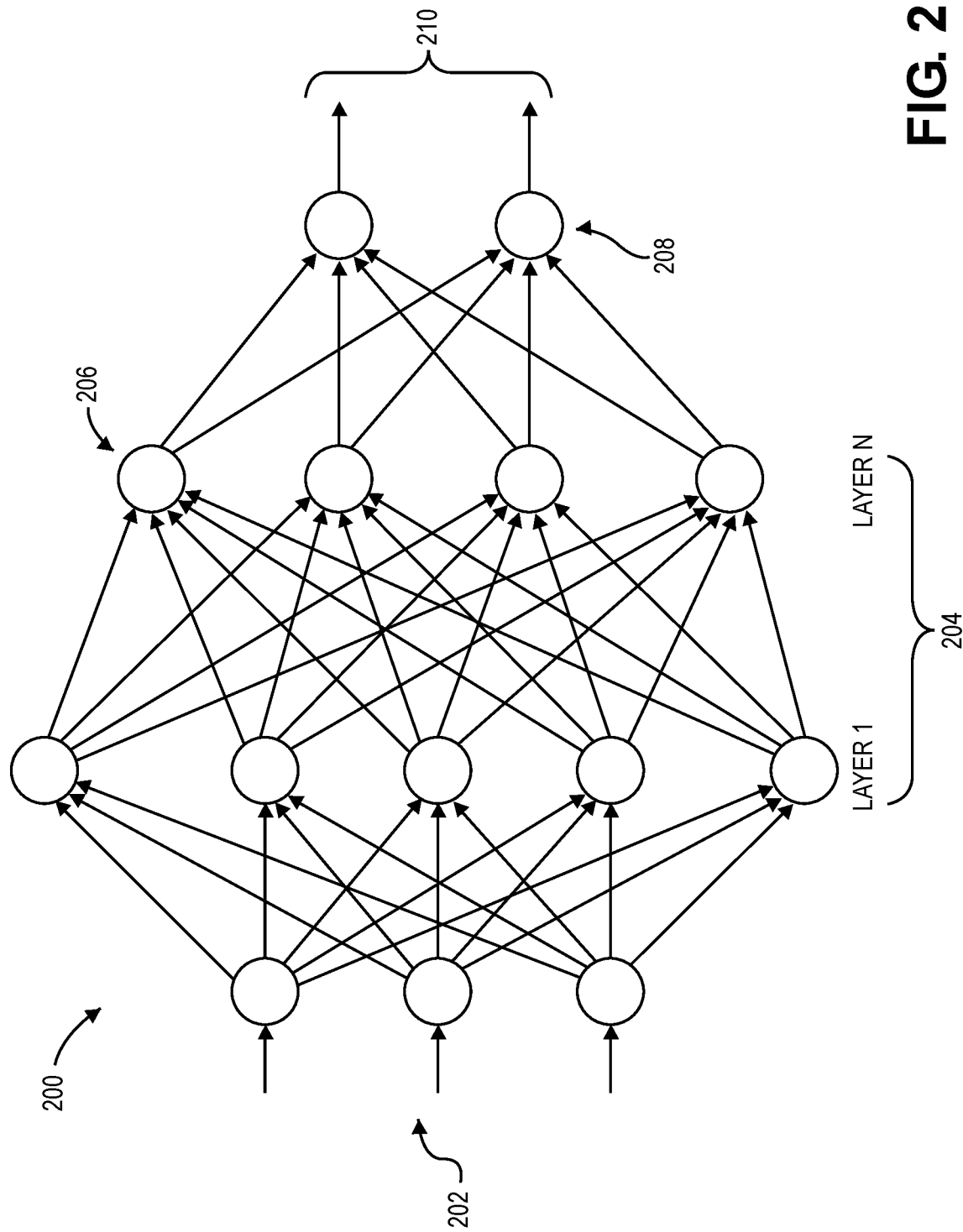
FIG. 2 depicts an exemplary deep learning artificial neural network (DNN) that may be employed by the systems and methods, in accordance with some embodiments.

FIG. 2 depicts an exemplary deep learning artificial neural network (DNN) 200, which may be used in conjunction with the machine learning techniques as discussed herein. The DNN 200 may be trained and/or operated by the portfolio analysis platform 155 of FIG. 1B, for example. The DNN 200 may include a plurality of layers, each of which include any number of respective neurons, or nodes.

The DNN 200 may include an input layer 202, one or more hidden layers 204, and an output layer 208. Each of the layers in the DNN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of DNNs are possible.

The input layer 202 may correspond to a large number of input parameters (e.g., one million inputs), in some embodiments, and may be analyzed serially or in parallel. Further, various neurons and/or neuron connections within the DNN may be initialized with any number of weights and/or other training parameters. Each of the neurons in the hidden layers 204 may analyze one or more of the input parameters from the input layer 202, and/or one or more outputs from a previous one or more of the hidden layers 204, to generate a decision 210 or other output. The output layer 208 may generate the decision 210 or more outputs, each indicating a prediction or an expected value. The number of input neurons may be stored as a predetermined value, and used to initialize a network for training.

In some embodiments and/or scenarios, the output layer 208 may include only a single output 210. For example, a neuron may correspond to one of the neurons in a hidden layer 206. Each of the inputs to the neuron may be weighted according to a set of weights W1 through Wi, determined during the training process (for example, if the neural network is a recurrent neural network) and then applied to a node that performs an operation α. The operation α may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 210 of the DNN. In some embodiments, the DNN may include one or more convolutional neural network (CNN) layers.

Figure 3:
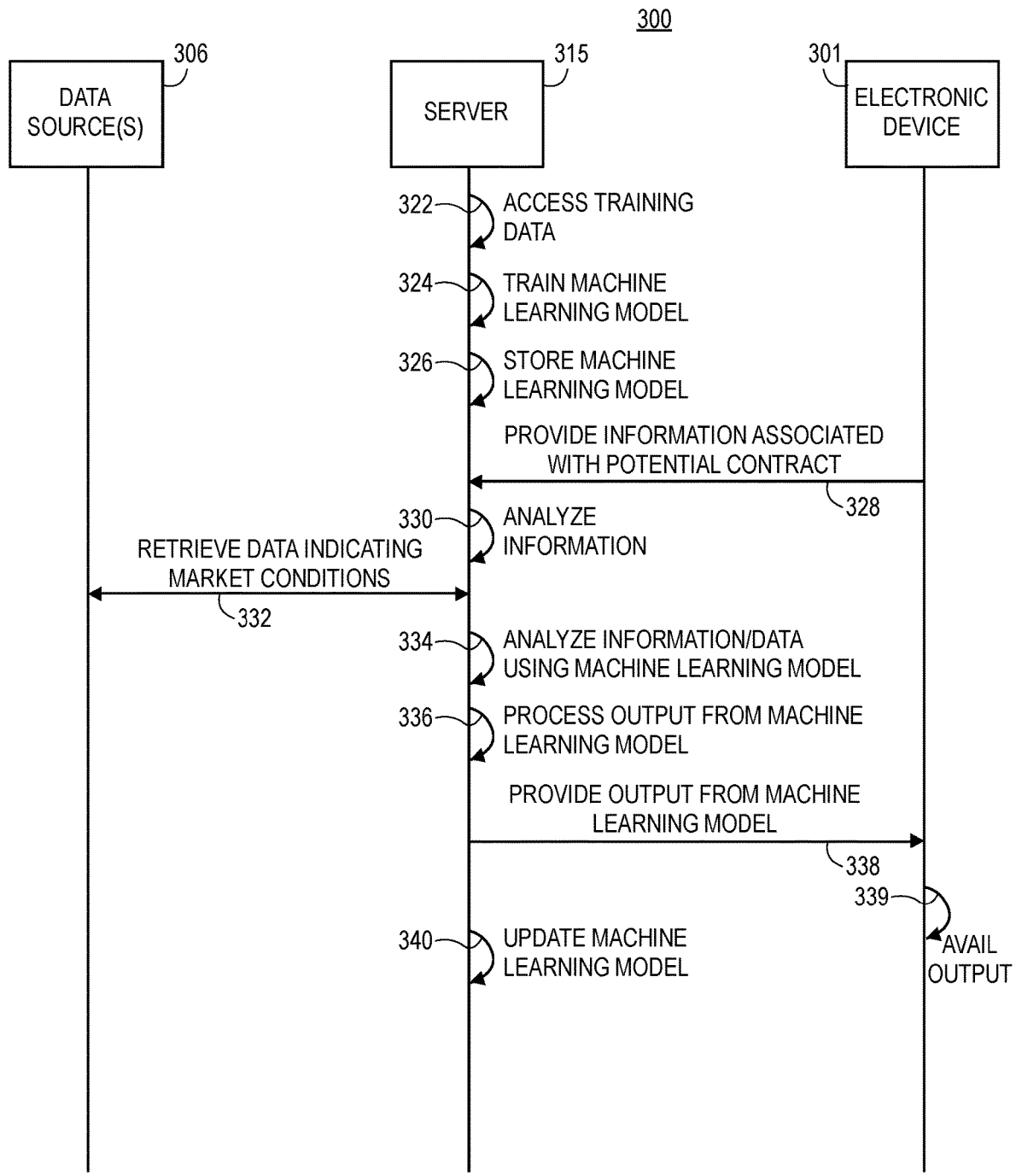
FIG. 3 depicts an example signal diagram associated with using machine learning for assessing contract conditions, in accordance with some embodiments.

FIG. 3 depicts a signal diagram 300 with various functionalities associated with the described embodiments. The signal diagram 300 includes the following components: one or more data sources 306, a server 315, and an electronic device 301. According to embodiments, the data source(s) 306 may be any data source having access to market conditions and other similar parameters, data, analytics, and the like. Further, the server 315 may be, for example, the server 115 as described with respect to FIG. 1A and may implement the portfolio analysis platform 155 as discussed with respect to FIG. 1B. Additionally, the electronic device 301 may be, for example, any of the electronic devices 101, 102, 103 as discussed with respect to FIG. 1A, where the electronic device 301 may be associated with a customer seeking analysis of its portfolio of contracts and potential contracts.

Although the signal diagram 300 is described as employing artificial intelligence and machine learning to implement and facilitate various of the functionalities, it should be appreciated that the signal diagram 300 may operate without artificial intelligence or machine learning. In this regard, the signal diagram 300 may access market conditions and other relevant data from the data source(s) 306 and perform calculations on the data to determine relevant output data.

The signal diagram 300 may start with the server 315 training a machine learning model. In particular, the server 315 may access (322) a set of training data or a training dataset. Generally, the set of training data may include information related to contracts entered into between two entities, and the parameters of those contracts. In particular, this information may include time periods and pricing parameters for contracts; goods, materials, commodities, or products specified by the contracts; transaction prices; customer constraints such as disallowed archetype shifts, minimum/maximum volume commitments, maximum/minimum price increases or decreases; price indices uses to track market prices; and/or other relevant data. For example, one contract may specify the delivery of copper at regular intervals over a two-year time period, with a formula pricing archetype being disallowed.

The server 315 may train (324) the machine learning model using the set of training data. It should be appreciated that the server 315 may train the machine learning model using any combination of one or more techniques, calculations, or the like. The server 315 may store (326) the machine learning model, for example in the database 113 as discussed with respect to FIG. 1A or the memory 157 as discussed with respect to FIG. 1B.

Before, during, or after the server 315 trains the machine learning model, the electronic device 301 may provide (328) information associated with one or more potential contracts to the server 115. Generally, the information may detail envisioned parameters for the potential contract(s). For example, the information may identify the parties/entities for the potential contract, any time periods, constraints (e.g., global spot archetype volume), and/or simulation parameters (e.g., market conditions and raw materials prices) for the potential contract(s), any customer constraints (e.g., disallowed archetype shifts, min/max volume commitments, maximum price increases or decreases), and the materials, commodities, or the like specified as part of the potential contract. In some embodiments, the information provided in (328) may include information for current contracts entered into by the customer, where the current contracts may or may not be up for renewal (i.e., a potential contract may be a renewal of an existing contract).

The server 315 may analyze (330) the information provided by the electronic device 301. In particular, the server 315 may review the information and determine relevant terms that may benefit from a further assessment or analysis using the machine learning model. For example, the server 315 may determine that the potential contract specifies for the delivery of two (2) tons of copper and one (1) ton of lithium, at regular intervals over the course of two years.

The server 315 may retrieve (332), from the data source(s) 306, data indicating various relevant market conditions, price indices, historical transaction data, and the like, that may be associated with the results of the analysis performed in (330). For example, the server 315 may retrieve historical prices for copper and lithium across various time periods. According to embodiments, the data may be supplemented with or modified by various factors. For example, one of the factors may be an expected change in raw materials prices (e.g., increasing, decreasing, or forecasted), and another of the factors may be certain market conditions (e.g., typical, loose/oversupplied, or tight/undersupplied).

The server 315 may analyze (334) the information and data provided, determined, or retrieved in (328), (330), and/or (332) using the machine learning model. In particular, the server 315 may input, into the machine learning model, at least a portion of the information and data provided, determined, or retrieved in (328), (330), and/or (332), to be analyzed by the machine learning model. In embodiments, the analysis may perform multiple different cost scenarios and projections of material prices and volatility thereof, simulate sudden increases or decreases in raw material prices to simulate shocks in the markets, and calculate price spread between regional prices of the same index and spread between raw materials and substitutes.

The server 315 may process (336) an output resulting from the analysis using the machine learning model. Generally, the analysis of the machine learning model may calculate or determine a set of potential parameters or outputs for the potential contract. In particular, the output may indicate high and low pricing scenarios for specified raw materials by simulating price and volatility while incorporating a combination of auto correlation, cross-correlation among raw materials, scaling vector, and sampling from multivariate normal distribution. Further, the output may indicate a set of calculated prices for each of the raw materials according to different pricing archetypes. For example, a formula price for a given raw material may be the cost plus a margin offset (i.e., a historical average margin for the customer), a spot price for a given raw material may be the formula price plus a premium that may be simulated using historical spreads that may be sampled from different market conditions, and an index price for a given raw material may be a set of weights multiplied by the formula price, where the set of weights may be calculated based on a historical average demand for a portion of customers. Additionally or alternatively, the output may indicate suggestion price protection periods (e.g., monthly, quarterly, etc.), bands of price limits, total absolute portfolio return, a worst-case return, a total incremental value opportunity, archetype recommendations and resultant value opportunities, and/or other data. Additionally or alternatively, the output may indicate an optimal or recommended chemical formula for a given product or material.

According to some embodiments, the machine learning model may perform its analysis for a portfolio of contracts, which may include a combination of a set of new potential contracts and a set of contract renewals. The output may indicate how future returns are projected to increase (or decrease) as well as how future risks are projected to decrease (or increase). Additionally or alternatively, the output may include a set of pricing models and/or a set of sales growth models associated with the potential contract.

For example, the machine learning model may output a set of proposed prices for each of the copper and the lithium, for certain time periods corresponding to the proposed contract, and for a certain pricing archetype (e.g., spot, formula, or index). Additionally, the server 315 may modify the output so that it conforms to the parameters or terms of the potential contract. For example, if the machine learning model outputs expected prices for copper and lithium for the next two years and if the potential contract is for these commodities for the next year, then the server 315 may modify the output so that it indicates prices for copper and lithium for the next year.

The server 315 may provide (338), to the electronic device 301, the output from the machine learning model. In embodiments, the provided output may be in the form of proposed terms or conditions for the proposed contract. The electronic device 301 may avail (339) the output, such as via a user interface, so that an individual(s) associated with the electronic device 101 may review the output. Generally, the output may inform how the potential contract could be structured or negotiated between parties. In particular, the output may detail the expected returns and risks for a potential contract across various pricing archetypes including spot, monthly quoted, formula, and indexed. The output may correspond to a portfolio of contracts in which the output may suggested a mix of pricing archetypes across the contracts in the portfolio.

In embodiments, the output may generate recommendations of future structure, terms, and estimated values. In particular, the output may identify a pricing mechanism (e.g., quarterly quoted, monthly spot, quarterly index linked, etc.), structures and terms (e.g., payment terms, price ladder, optionality approach to exit, etc.), and likely contract value (e.g., base, high, and most likely).

According to embodiments, the output may be availed across a reporting or analysis dashboard, which may include a performance dashboard that may support data visualization and analyses as well as various reports and notifications (e.g., email, text, and/or app notifications). An individual associated with the customer may review the output and select a target portfolio based on various factors including, for example, the selected portfolio being in line with product line strategy, taking into account market situations and considering competitive intensity. Additionally, the individual may use the output to determine an engagement schedule with its customers, develop customer communication and discovery plans to test recommendations, incorporate into a long-term contract strategy, and utilize models in support of negotiations strategies with the customers. Moreover, the individual may use the output to understand and document preferences before beginning contract negotiations, ensure that the proposed recommendation is aligned to the customer's preferences (and if not, ensure that an alternative recommendation(s) exits that aligns with preferences), and if an alternative recommendation is agreed upon, minimize value leakage through compliance tracking.

Generally, the information may enable customers to consider customer preferences such as preferences for specific contract terms, archetypes, price, or any other controllable factors, customer context factors such as on-the-ground intelligence regarding customer behavior (e.g., competitive positioning, other supply sources, competition, etc.), and customer value such as a customer's value contribution to the overall portfolio.

The server 315 may update (340) the machine learning model with any updated data. In particular, the server 315 may access or retrieve real-world data indicative of any signed contracts resulting from the negotiation, and may update the machine learning model with this data so that the machine learning model may be consistently up-to-date.

Figure 4:
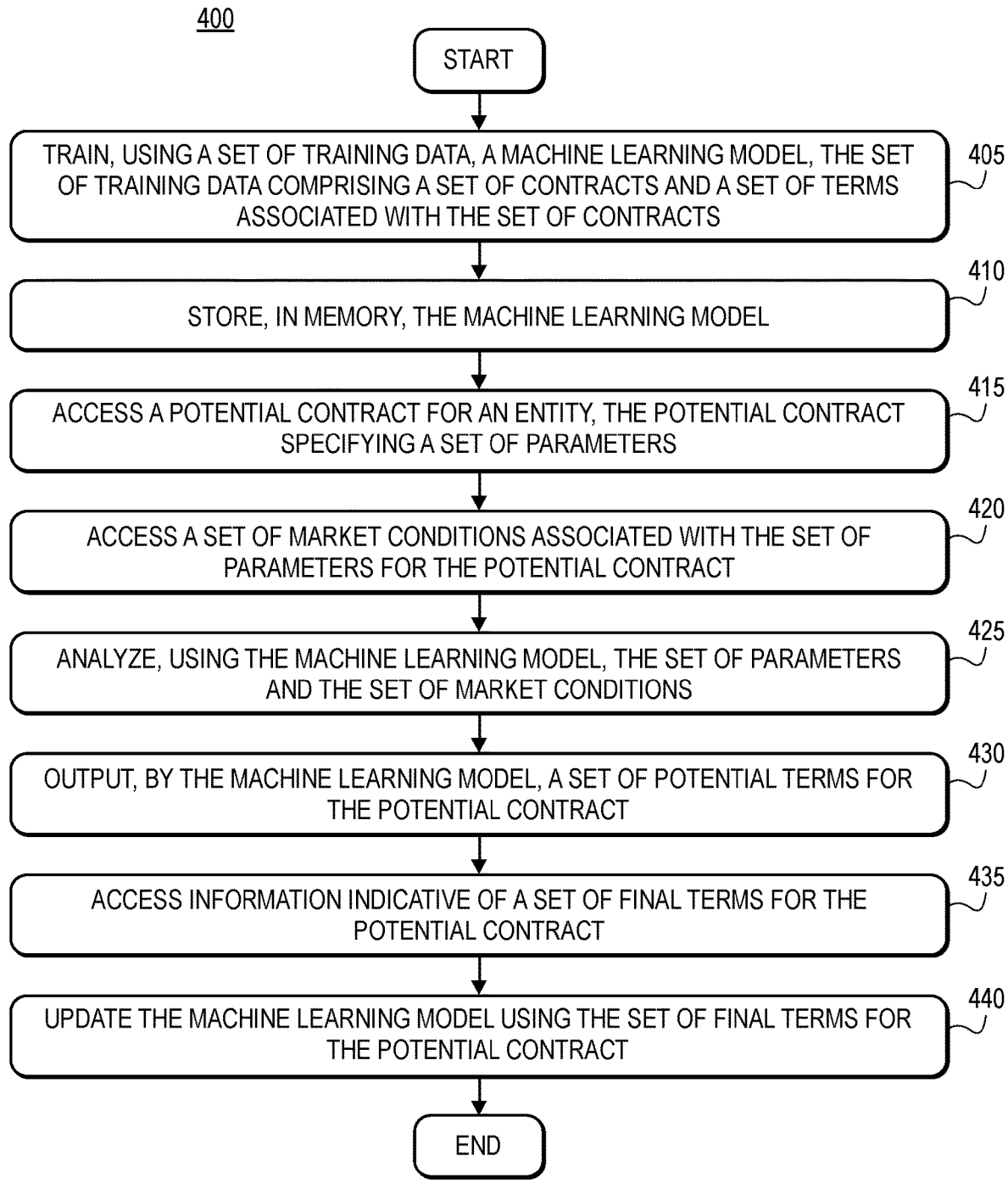
FIG. 4 illustrates an example flow diagram of using machine learning to assess contracts, in accordance with some embodiments.

FIG. 4 depicts is a block diagram of an example method 400 of using machine learning to assess contracts. The method 400 may be facilitated by an electronic device (such as the server computer 115 as depicted in FIG. 1A). In embodiments, the electronic device may communicate with a set of data sources and a set of additional electronic devices. As discussed herein, it should be appreciated that the electronic device may execute or facilitate the method 400 without training or using a machine learning model.

The method 400 may begin when the electronic device trains (block 405), using a set of training data, a machine learning model. According to embodiments, the set of training data may include a set of contracts and, for each contract of the set of contracts, a set of terms associated with that contract. The electronic device may store (block 410), in memory, the machine learning model.

The electronic device may access (block 415) a potential contract for an entity, where the potential contract may specify a set of parameters. Further, the electronic device may access (block 420) a set of market conditions associated with the set of parameters for the potential contract. According to embodiments, the electronic device may interface with at least one data source to retrieve the set of market conditions associated with the set of parameters for the potential contract. Further, in embodiments, the set of parameters may identify one or more of: a set of commodities for the potential contract, a set of time constraints, or a set of customer-specific constraints. If the set of parameters identifies a set of commodities, the electronic device may access a set of historical prices (i.e., the set of market conditions) associated with the set of commodities.

The electronic device may analyze (block 425), using the machine learning model, the set of parameters and the set of market conditions. Based on the analysis, electronic device may output (block 430), by the machine learning model, a set of potential terms for the potential contract. In embodiments, the electronic device may output, by the machine learning model, at least one of: a set of pricing mechanisms, a set of price protections, or a set of price limits for the potential contract.

The electronic device may access (block 435) information indicative of a set of final terms for the potential contract. According to embodiments, the potential contract may be executed or entered into by the relevant parties/entities, where the entered-into contract has the final terms. The electronic device may update (block 440) the machine learning model using the set of final terms for the potential contract. In this regard, the electronic device may continuously update the machine learning model using terms from finalized contracts.

Figure 5A:
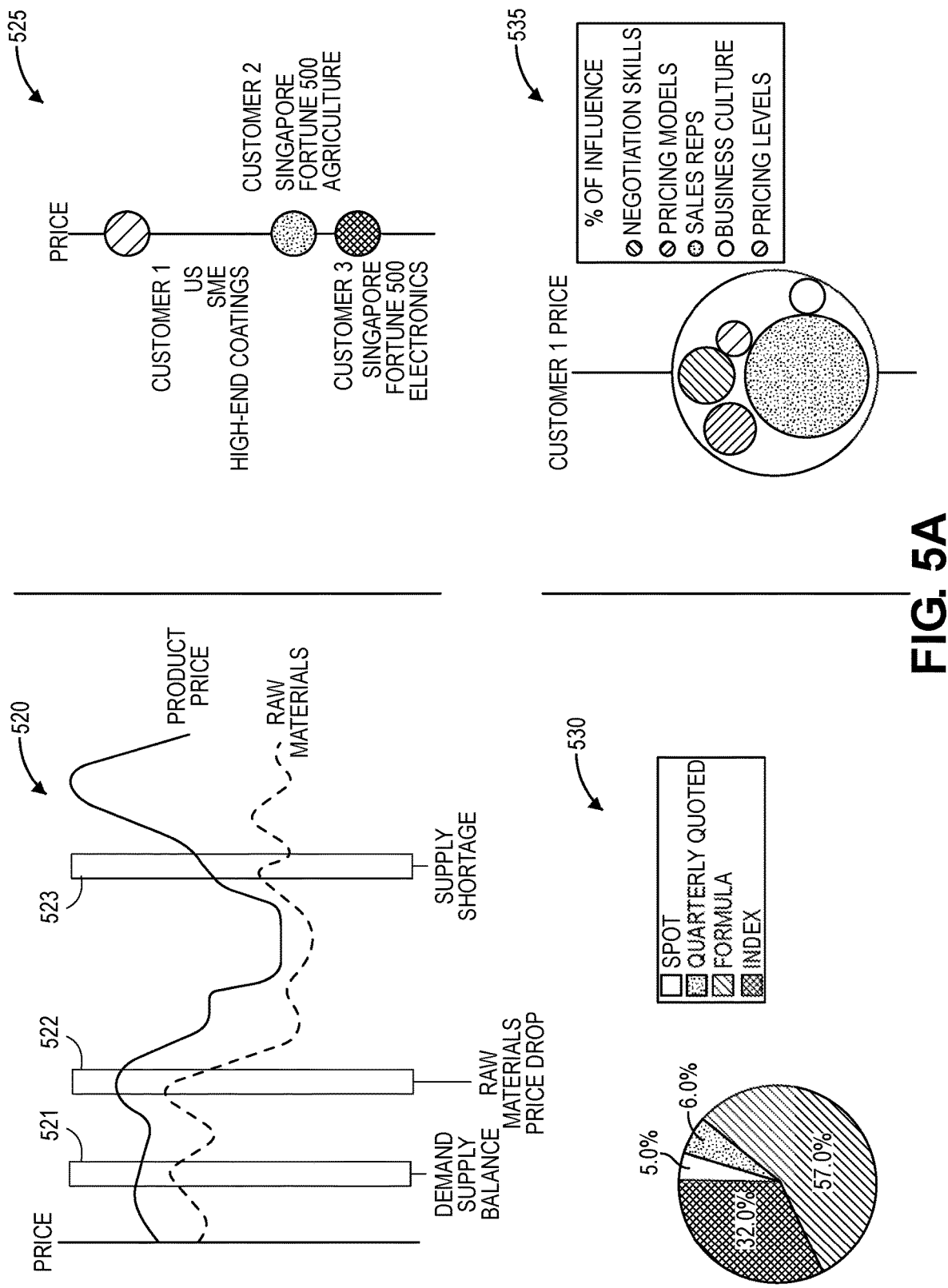
FIGS. 5A-5C are example depictions of various data, visualizations, and dashboards associated with the systems and methods, in accordance with some embodiments.

FIG. 5A illustrates various depictions of data and other factors that may influence pricing across various companies or entities. In particular, FIG. 5A illustrates a depiction 520 of market pricing foresight that may consider dynamic variability in demand-supply balance, raw material cost, and capacity. The depiction 520 graphs a price of a product and its underlying raw materials, over time. Certain combinations of these prices result may indicate different supply and pricing scenarios. In particular, section 521 indicates a balance in supply and demand, section 522 indicates a drop in raw materials price, and section 523 indicates a supply shortage.

FIG. 5A also illustrates a depiction 525 of perceived values to pay by different customers (Customer 1, Customer 2, and Customer 3) for a given raw material, which may be driven by differences in alternatives and various competitive dynamics. Additionally, FIG. 5A illustrates a depiction 530 of different contract strategies to account for risk-adjusted return on different pricing structures, namely spot, quarterly quoted, formula, and index. Further, FIG. 5A illustrates a depiction 535 of different decision insights that may influence individuals (e.g., sales reps) to account for differences in negotiation skills. In particular, the depiction 535 includes factors that influences a given customer's price associated with contract pricing, including negotiation skills, pricing models, sales reps, business culture, and pricing levels.

Figure 5B:
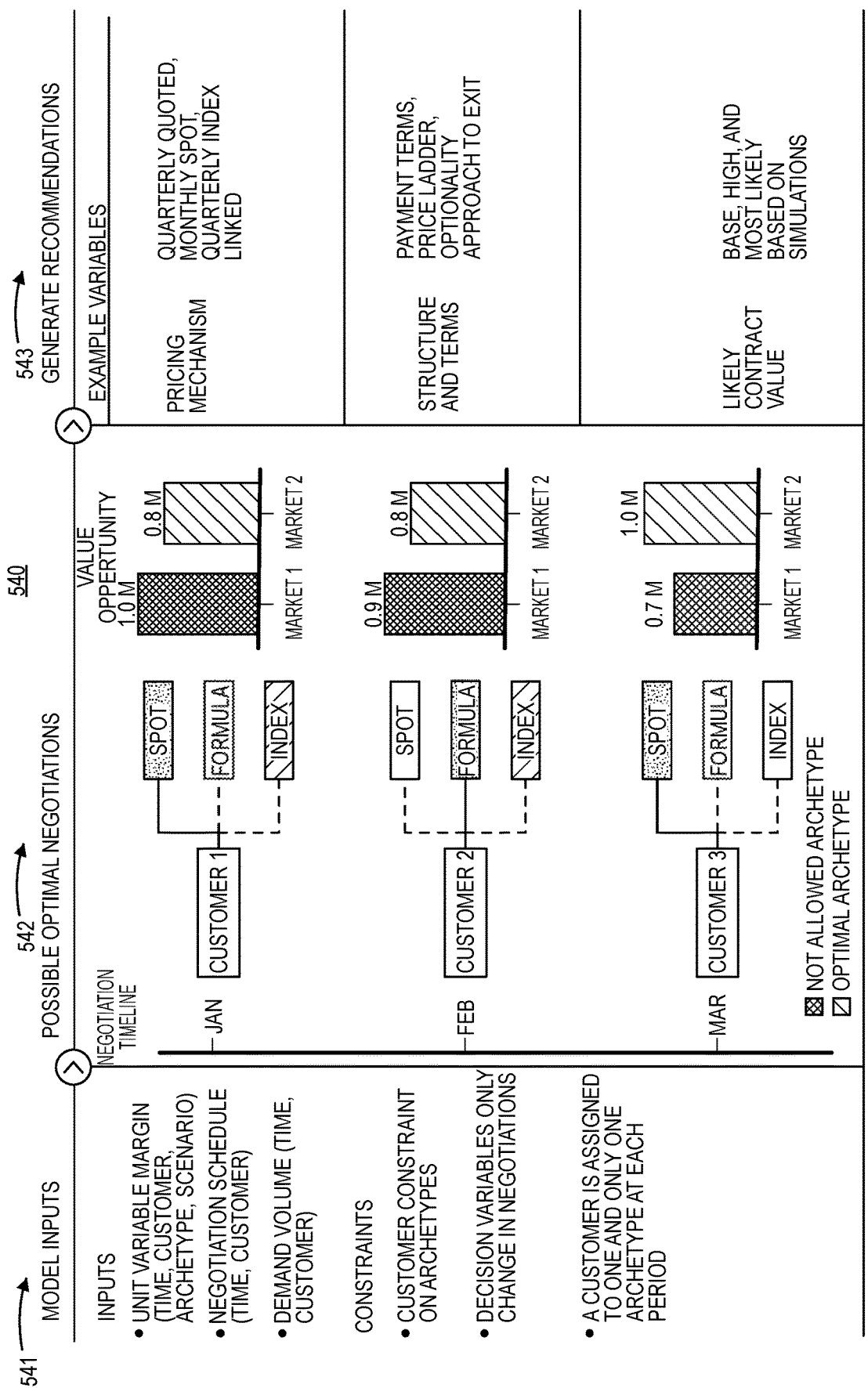

FIG. 5B illustrates a depiction 540 of various functionalities that may be facilitated by the systems and methods as described herein. In particular, reference 541 indicates different inputs that may be analyzed by the described machine learning model. In particular, the inputs may include different input parameters as shown: unit variable margin parameters (e.g., time, customer, architype, and scenario), a negotiation schedule (e.g., time and customer), and a demand volume (e.g., time and customer); and different constraints as shown: customer constraint on pricing archetypes (e.g., spot, formula, and index) and decision variables associated with negotiations.

FIG. 5B further includes a reference 542 indicating possible negotiations with a set of customers with different negotiation timelines (as shown: Customer 1 in January, Customer 2 in February, and Customer 3 in March) and associated value opportunities. In particular, the negotiation with Customer 1 has disallowed the index archetype and indicates that the spot pricing mechanism is the optimal archetype, resulting in a $1.0M value opportunity in "market 1" and a $0.8M value opportunity in "market 2"; the negotiation with Customer 2 has disallowed the index archetype and indicates that the formula pricing mechanism is the optimal archetype, resulting in a $0.9M value opportunity in "market 1" and a $0.8M value opportunity in "market 2"; and the negotiation with Customer 3 indicates that the spot pricing mechanism is the optimal archetype, resulting in a $0.7M value opportunity in "market 1" and a $1.0M value opportunity in "market 2".

FIG. 5B further includes a reference 543 indicating recommendations that may be provided to a customer, for example via a dashboard interface. In particular, the recommendations may include different pricing mechanisms including quarterly quoted, monthly spot, quarterly index linked, and/or others; different structures and terms including payment terms, price ladders, approaches to exit, and/or others; and different likely contract values, including base, high, and most-likely, based on simulations.

Figure 5C:
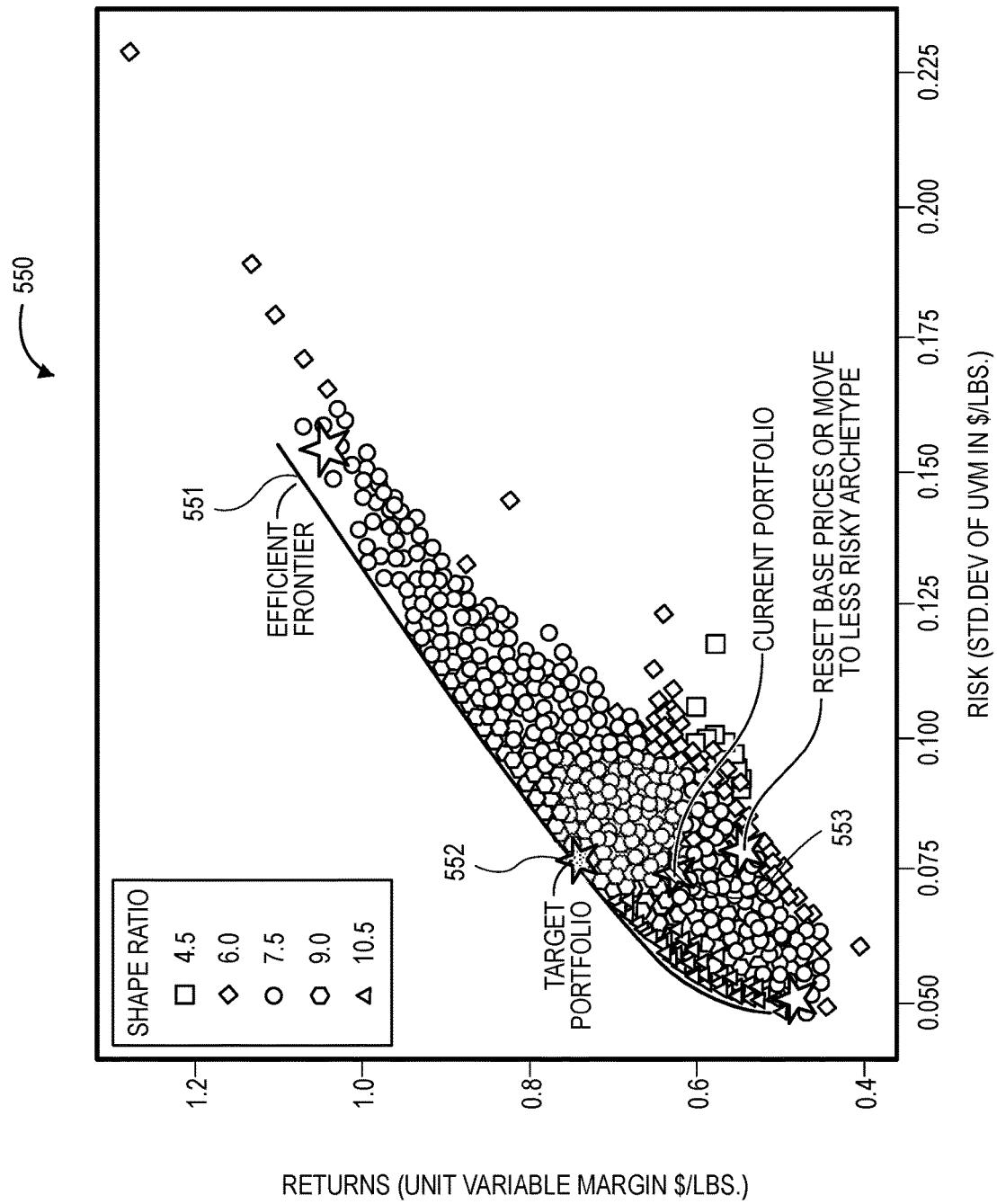

FIG. 5C illustrates an example visualization 550 of an output that may be provided to a customer as a result of a machine learning model analysis. In the visualization 550, a line 551 indicates an "efficient frontier" representing an efficient balance of risk versus return. Further, in the visualization 550, a current portfolio of the company is indicated by 553 and a target portfolio (i.e., representing the output of the machine learning model) is indicated by 552, where the target portfolio offers greater return with a similar risk profile when compared to the current portfolio. Although not depicted in FIG. 5C, the visualization 550 may indicate a monetary value gain associated with selecting the target portfolio over the current portfolio.

Figure 6:
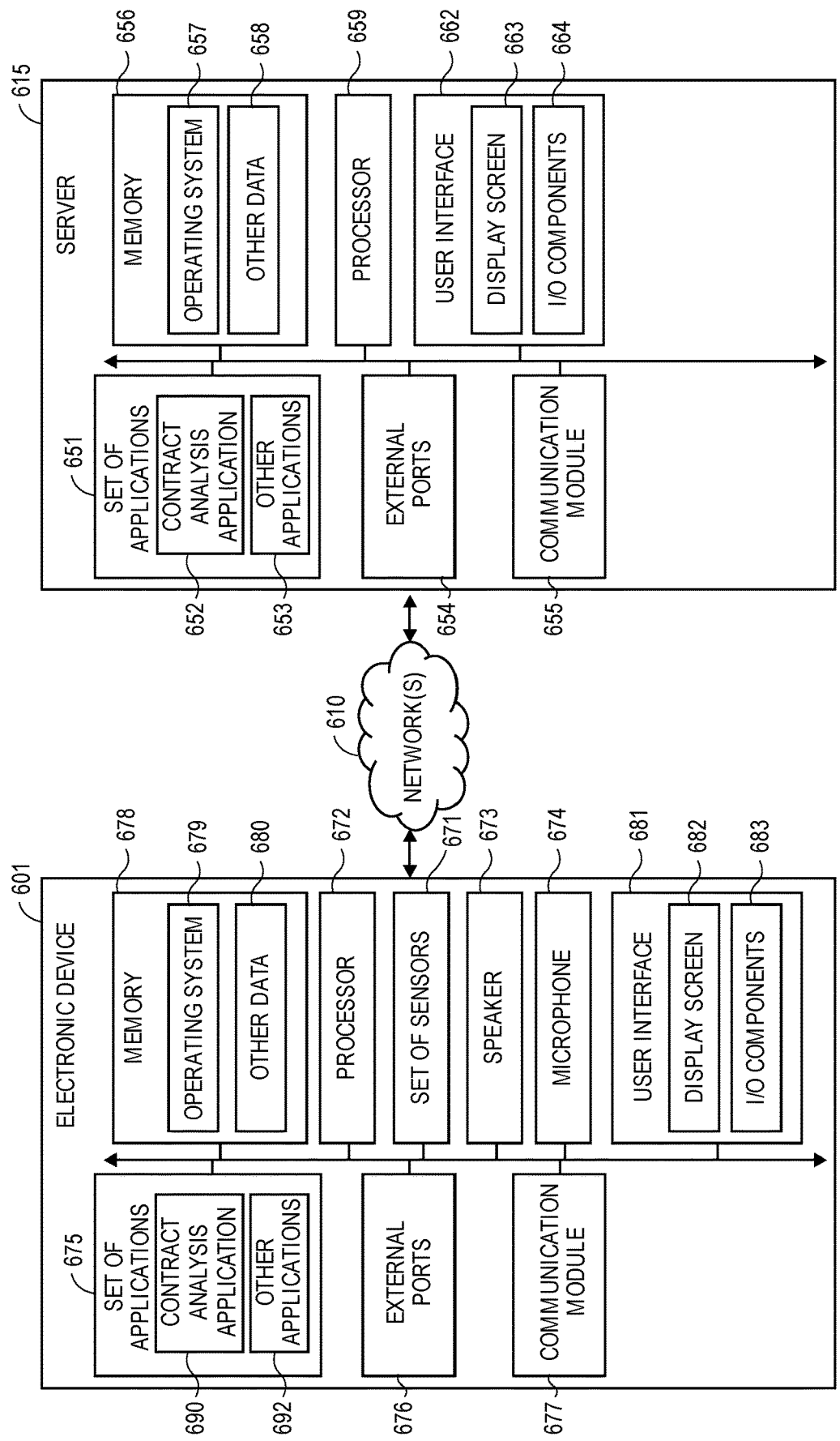
FIG. 6 is an example hardware diagram of an electronic device and a server configured to perform various functionalities, in accordance with some embodiments.

FIG. 6 illustrates a hardware diagram of an example electronic device 601 (e.g., one of the electronic devices 101, 102, 103, 301 as described with respect to FIGS. 1A and 3) and an example server 615 (e.g., one of the servers 115, 315 as described with respect to FIGS. 1A and 3), in which the functionalities as discussed herein may be implemented. It should be appreciated that the components of the electronic device 601 and the server 615 are merely exemplary, and that additional or alternative components and arrangements thereof are envisioned.

The electronic device 601 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a contract analysis application 690, such as to access various data, train machine learning models, and analyze data using the machine learning models. It should be appreciated that one or more other applications 692 are envisioned.

The processor 672 may interface with the memory 678 to execute the operating system 679 and the set of applications 675. According to some embodiments, the memory 678 may also store other data 680, such as machine learning model data and/or other data such as parameters, market conditions, and/or other data that may be used in the analyses and determinations as discussed herein. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 601 may further include a communication module 677 configured to communicate data via one or more networks 610. According to some embodiments, the communication module 677 may include one or more transceivers (e.g., WAN, WWAN, WLAN, and/or WPAN transceivers) functioning in accordance with IEEE standards, 3GPP standards, or other standards, and configured to receive and transmit data via one or more external ports 676.

The electronic device 601 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 601 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, and/or built in or external keyboard). Additionally, the electronic device 601 may include a speaker 673 configured to output audio data and a microphone 674 configured to detect audio.

In some embodiments, the electronic device 601 may perform the functionalities as discussed herein as part of a "cloud" network or may otherwise communicate with other hardware or software components within the cloud to send, retrieve, or otherwise analyze data.

As illustrated in FIG. 6, the electronic device 601 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a contract analysis application 652, such as to access various data, train machine learning models, and analyze data using the machine learning models. It should be appreciated that one or more other applications 653 are envisioned.

The processor 659 may interface with the memory 656 to execute the operating system 657 and the set of applications 651. According to some embodiments, the memory 656 may also store other data 658, such as machine learning model data and/or other data such as parameters, market conditions, and/or other data that may be used in the analyses and determinations as discussed herein. The memory 656 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WAN, WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs, external or built in keyboard). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of using machine learning to assess contracts, the method comprising:

training, by one or more processors using a set of training data, a machine learning model, the set of training data comprising a set of contracts and, for each contract of the set of contracts, a set of terms associated with that contract, wherein at least one contract of the set of contracts indicates a disallowed pricing archetype;

storing, in one or more memories, the machine learning model;

accessing, by the one or more processors, a potential contract between an entity and a customer, the potential contract specifying a set of parameters, wherein at least one of the set of parameters indicates a pricing archetype that is disallowed by the customer;

accessing, by the one or more processors, a set of market conditions associated with the set of parameters for the potential contract;

analyzing, by the one or more processors using the machine learning model, the set of parameters and the set of market conditions;

based on analyzing the set of parameters and the set of market conditions, outputting, by the machine learning model, a set of potential terms for the potential contract, wherein the set of potential terms accounts for the pricing archetype that is disallowed by the customer;

updating the machine learning model using data associated with a contract signed between the entity and the customer resulting from the potential contract; and analyzing, using the machine learning model that was updated, a subsequent potential contract.

2. The computer-implemented method of claim 1, wherein accessing the set of market conditions comprises:
   interfacing with at least one data source to retrieve the set of market conditions associated with the set of parameters for the potential contract.

3. The computer-implemented method of claim 1, wherein the set of parameters identifies a set of commodities for the potential contract; and wherein accessing the set of market conditions comprises:
   accessing a set of historical prices associated with the set of commodities.

4. The computer-implemented method of claim 1, wherein the set of parameters identifies a set of time constraints and a set of customer-specific constraints.

5. The computer-implemented method of claim 1, wherein outputting the set of potential terms for the potential contract comprises:
   based on analyzing the set of parameters and the set of market conditions, outputting, by the machine learning model, at least one of: a set of pricing mechanisms, a set of price protections, or a set of price limits for the potential contract.

6. The computer-implemented method of claim 1, wherein analyzing, using the machine learning model, the set of parameters and the set of market conditions comprises:
   analyzing, using the machine learning model, a plurality of sets of parameters and a plurality of sets of market conditions respectfully associated with a plurality of potential contracts;
   and wherein the machine learning model outputs a plurality of sets of terms for the plurality of potential contracts.

7. A system for using machine learning for assessing contracts, comprising:
   a memory storing a set of computer-readable instructions and data associated with a machine learning model; and
   one or more processors interfaced with the memory, and configured to execute the set of computer-readable instructions to cause the one or more processors to:
      train, using a set of training data, the machine learning model, the set of training data comprising a set of contracts and, for each contract of the set of contracts, a set of terms associated with that contract, wherein at least one contract of the set of contracts indicates a disallowed pricing archetype,
      store, in the memory, the machine learning model,
      access a potential contract between an entity and a customer, the potential contract specifying a set of parameters, wherein at least one of the set of parameters indicates a pricing archetype that is disallowed by the customer,
      access a set of market conditions associated with the set of parameters for the potential contract,
      analyze, using the machine learning model, the set of parameters and the set of market conditions,
      based on analyzing the set of parameters and the set of market conditions, output, by the machine learning model, a set of potential terms for the potential contract, wherein the set of potential terms accounts for the pricing archetype that is disallowed by the customer,
      update the machine learning model using data associated with a contract signed between the entity and the customer resulting from the potential contract, and
      analyze, using the machine learning model that was updated, a subsequent potential contract.

8. The system of claim 7, wherein to access the set of market conditions, the processor is configured to:
   interface with at least one data source to retrieve the set of market conditions associated with the set of parameters for the potential contract.

9. The system of claim 7, wherein the set of parameters identifies a set of commodities for the potential contract; and wherein the set of market conditions comprises a set of historical prices associated with the set of commodities.

10. The system of claim 7, wherein the set of parameters identifies a set of time constraints and a set of customer-specific constraints.

11. The system of claim 7, wherein the set of potential terms for the potential contract output by the machine learning model comprises at least one of: a set of pricing mechanisms, a set of price protections, or a set of price limits for the potential contract.

12. The system of claim 7, wherein to analyze, using the machine learning model, the set of parameters and the set of market conditions, the processor is configured to:
   analyze, using the machine learning model, a plurality of sets of parameters and a plurality of sets of market conditions respectfully associated with a plurality of potential contracts;
   and wherein the machine learning model outputs a plurality of sets of terms for the plurality of potential contracts.

13. A non-transitory computer-readable storage medium configured to store instructions executable by one or more processors, the instructions comprising:
   instructions for training, using a set of training data, a machine learning model, the set of training data comprising a set of contracts and, for each contract of the set of contracts, a set of terms associated with that contract, wherein at least one contract of the set of contracts indicates a disallowed pricing archetype;
   instructions for storing, in one or more memories, the machine learning model;
   instructions for accessing a potential contract between an entity and a customer, the potential contract specifying a set of parameters, wherein at least one of the set of parameters indicates a pricing archetype that is disallowed by the customer;
   instructions for accessing a set of market conditions associated with the set of parameters for the potential contract;
   instructions for analyzing, using the machine learning model, the set of parameters and the set of market conditions;
   instructions for, based on analyzing the set of parameters and the set of market conditions, outputting, by the machine learning model, a set of potential terms for the potential contract, wherein the set of potential terms accounts for the pricing archetype that is disallowed by the customer;
   instructions for updating the machine learning model using data associated with a contract signed between the entity and the customer resulting from the potential contract; and
   instructions for analyzing, using the machine learning model that was updated, a subsequent potential contract.

14. The non-transitory computer-readable storage medium of claim 13, wherein the instructions for accessing the set of market conditions comprise:

instructions for interfacing with at least one data source to retrieve the set of market conditions associated with the set of parameters for the potential contract.

15. The non-transitory computer-readable storage medium of claim 13, wherein the set of parameters identifies a set of commodities for the potential contract; and
wherein the instructions for accessing the set of market conditions comprise:
instructions for accessing a set of historical prices associated with the set of commodities.

16. The non-transitory computer-readable storage medium of claim 13, wherein the set of parameters identifies a set of time constraints and a set of customer-specific constraints.

17. The non-transitory computer-readable storage medium of claim 13, wherein the instructions for outputting the set of potential terms for the potential contract comprise:
instructions for, based on analyzing the set of parameters and the set of market conditions, outputting, by the machine learning model, at least one of: a set of pricing mechanisms, a set of price protections, or a set of price limits for the potential contract.

\* \* \* \* \*